United States Patent [19]
Allen et al.

[11] Patent Number: 5,068,531
[45] Date of Patent: Nov. 26, 1991

[54] METHOD AND APPARATUS FOR PRODUCING A POROSITY LOG OF A SUBSURFACE FORMATION CORRECTED FOR DETECTOR STANDOFF

[75] Inventors: L. Scott Allen, Dallas; William R. Mills, Plano; Daivd C. Stromswold, Addison, all of Tex.

[73] Assignee: Mobil Oil Corporation, Fairfax, Va.

[21] Appl. No.: 680,711

[22] Filed: Apr. 4, 1991

[51] Int. Cl.[5] .............................................. G01V 5/10
[52] U.S. Cl. .................................. 250/269; 250/262; 250/268
[58] Field of Search ............... 250/262, 268, 269, 270, 250/267; 364/422

[56] References Cited

U.S. PATENT DOCUMENTS

| | | | |
|---|---|---|---|
| 4,097,737 | 6/1978 | Mills, Jr. .............................. | 250/269 |
| 4,556,793 | 12/1985 | Allen et al. ......................... | 250/267 |
| 4,581,532 | 4/1986 | Givens et al. ....................... | 250/266 |
| 4,590,370 | 5/1986 | Mills, Jr. et al. .................... | 250/267 |
| 4,600,858 | 7/1986 | Steinman et al. ................... | 250/270 |
| 4,625,110 | 11/1986 | Smith, Jr. ............................ | 250/269 |
| 4,638,161 | 1/1987 | Smith, Jr. et al. .................. | 250/269 |
| 4,692,617 | 9/1987 | Allen et al. ......................... | 250/268 |
| 4,972,082 | 11/1990 | Loomis et al. ...................... | 250/262 |

OTHER PUBLICATIONS

"Improved Methods of Signal Processing for Pulsed Neutron Capture Logging", SPWLA 22nd Annual Logging Symposium, Jun. 23–26, 1981, Randall et al.

*Primary Examiner*—Carolyn E. Fields
*Assistant Examiner*—Drew A. Dunn
*Attorney, Agent, or Firm*—Alexander J. McKillop; Charles J. Speciale; George W. Hager, Jr.

[57] ABSTRACT

A borehole logging tool is lowered into a borehole traversing a subsurface formation and a neutron detector measures the die-away of nuclear radiation in the formation. A model of the die-away of nuclear radiation is produced using exponential terms varying as the sum of borehole, formation and thermal neutron background components. Exponentially weighted moments of both the die-away measurements and die-away model are determined and equated. The equated moments are solved for the ratio of the borehole to formation amplitude components of the measurements. The formation decay constant is determined from at least the formation and thermal neutron background terms of the weighted measurement and model moments. The determined borehole to formation amplitude ratio is used to correct the determined formation decay constant for the effects of detector standoff from the borehole wall. A porosity log of the formation is produced which is corrected for detector standoff from the borehole wall as a function of the standoff corrected formation decay constant calibrated in borehole models of known porosities.

10 Claims, 5 Drawing Sheets

METHOD AND APPARATUS FOR PRODUCING A POROSITY LOG OF A SUBSURFACE FORMATION CORRECTED FOR DETECTOR STANDOFF

BACKGROUND OF THE INVENTION

This invention relates to a borehole logging method for measuring the die-away of nuclear radiation of a subsurface formation and for correcting signals representative of the decay constants and amplitudes of the measured radiation for the effects of detector standoff from the borehole wall of the formation where such signals may vary with time, distance, or any other independent variable. A porosity versus depth log is then produced for the subsurface formation as a function of the standoff corrected formation decay constant derived from calibrated measurements in borehole models of known porosities and conditions of detector standoff.

A borehole logging tool is conventionally used to measure the die-away of nuclear radiation in the formations surrounding a borehole. In neutron porosity logging, for example, a neutron source is utilized for bombarding the formations with fast neutrons as the logging tool is advanced through the borehole. In the course of moderation, the fast neutrons reach the epithermal range and thence are further moderated until they reach the thermal neutron range. The populations of neutrons at the various energy levels die-away with time following primary irradiation and thus offer means of characterizing the formations. The rate of die-away of the epithermal neutron population gives a quantitative indication of the amount of hydrogenous material present in the formations which in turn is indicative of the porosities of the formations. Examples of both methods and apparatus for carrying out epithermal die-away porosity logging are set forth in U.S. Pat. No. 4,097,737 to W. R. Mills, Jr., and U.S. Pat. Nos. 4,556,793 and 4,590,370 to L. S. Allen and W. R. Mills, Jr.

An article entitled "Improved Methods of Signal Processing For Pulsed Neutron Capture Logging", SPWLA Twenty Second Annual Logging Symposium, June 23-26, 1981 by R. Randall and E. C. Hopkinson discusses a method of pulsed neutron capture logging to differentiate oil, gas and saline formation water environments through casing. The method applies statistical averaging to a single exponential die-away term in the logged data to determine thermal neutron decay rate. In a still further reference, U.S. Pat. No. 4,600,838 to D. K. Steinman and L. A. Jacobson, there is described a method of thermal neutron die-away logging for overcoming excessive statistical fluctuations in the logged data, particularly in strongly absorbing formations. This method involves the determination of zero and first order moments of time during first and second discrete sequences of time gates respectively and the taking of the ratio of such moments to obtain a thermal neutron decay constant for the formations surrounding the logged borehole. In yet further references, Smith, Jr. U.S. Pat. No. 4,625,110, and U.S. Pat. No. 4,638,161 to Smith, Jr. and Verbout, there is described a porosity determination utilizing a two-exponential model approach to epithermal neutron die-away. Finally, Loomis U.S. Pat. No. 4,972,082 discloses use of a modulated exponential function to provide correction of an epithermal neutron die-away measurement for the situation where the logging tool is not in good contact with the borehole wall.

While the foregoing described methods and systems have been utilized in the production of well logs for characterizing the die-away of nuclear radiation of subsurface formations, there is still need for a very sensitive method of improving on the characterizations provided by porosity logs when the neutron detector of the logging tool is not in contact with the formation (i.e., separation or standoff of the logging tool detector from the borehole wall). Hereinafter, such separations will be referred to as standoff, although they can arise from the logging tool pulling away from the surface of the borehole wall or from the borehole enlarging away from the logging tool. In such cases, the formation decay constant determined from the die-away of nuclear radiation measurements will be in error by the degree of effect such standoff has on the measurement. It is therefore an object of the present invention to provide for a porosity log generated from a standoff corrected formation decay constant such that the formation may be accurately characterized as to porosity.

SUMMARY OF THE INVENTION

The present invention is directed to a method for measuring the die-away of nuclear radiation of a subsurface formation surrounding a borehole and for correcting such measurements for the effect of logging tool detector standoff from the borehole wall of the formation so that an accurate formation porosity log may be produced.

A logging tool is lowered into a borehole traversing a subsurface formation of interest and measurements are obtained of the die-away of nuclear radiation in the formation. Signals are generated representative of the intensity of the measurements. A model of such signals is generated having three exponential terms varying as the sum of the borehole, formation and thermal neutron background effects on such measurements. This is a complete representation of the principal components of the die-away process and provides a very sensitive parameter for correcting measured lifetimes for logging tool standoff. Three exponentially weighted signal moments and three exponentially weighted model moments are determined. These moments are equated and solved for the ratio of the borehole amplitude to the formation amplitude components of the signals. An initial formation decay constant is determined from a solution of the moment equations which involves at least the formation and thermal neutron background terms of the exponentially weighted signal and model moments. This formation decay constant is corrected for standoff of the detector from the borehole wall in accordance with a function relating such decay constant to the ratio of borehole to formation amplitudes. This function is derived from intensity logging measurements taken in borehole models at several porosities and conditions of logging tool separation from the formation. A porosity versus depth log is produced as a function of the standoff corrected formation decay constant derived from calibration measurements in the borehole models at known porosities and conditions of detector standoff from the borehole wall.

DESCRIPTION OF THE PREFERRED EMBODIMENT

Figure 1:
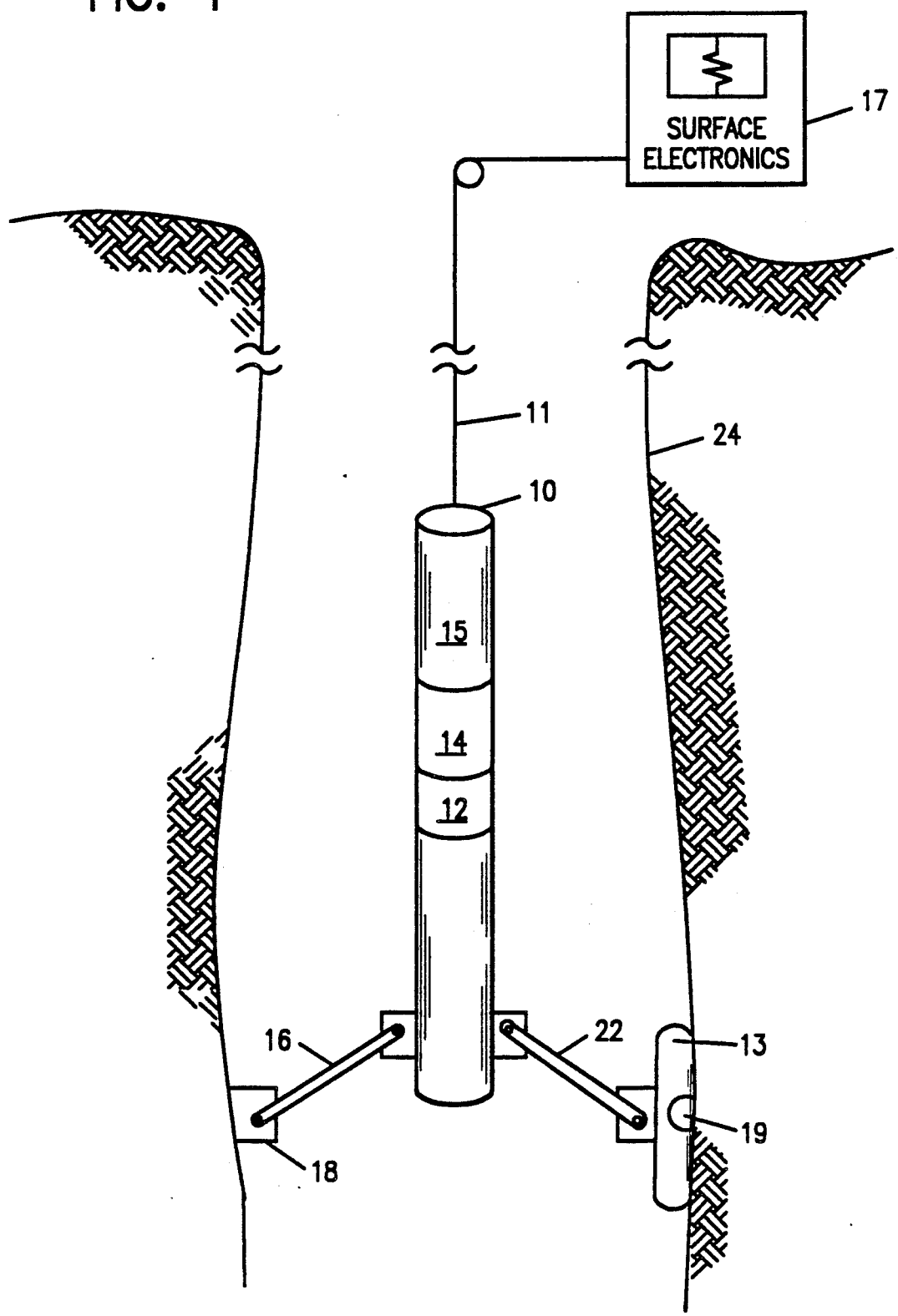
FIG. 1 illustrates a borehole logging system for making die-away measurements of nuclear radiation from a subsurface formation surrounding a borehole and for producing a porosity versus depth log of such formation.

Referring to FIG. 1, there is illustrated a borehole logging system useful in logging a subsurface formation for porosity in accordance with the present invention.

A borehole tool 10, supported by cable 11, comprises a high energy pulsed neutron source 12 and an articulated radiation detector pad 13. A high-voltage power supply 14 is provided for the source 12 and a downhole electronics unit 15 is provided with circuits for utilization and modification of signals from radiation detector pad 13. Also included are circuits for the control of the high voltage power supply 14. A backup arm 16 with attached pad 18 extending from the logging tool 10 may be included to force the logging tool 10 to follow the average contour of the borehole wall 24. Cable 11 extends to a surface electronics unit 17 where the signals from the radiation detector pad 13 are processed and recorded, along with an indication of depth, as a porosity log of the subsurface formation.

Particularly troublesome, however, to such a radiation measurement is the presence of rugosity in the borehole wall. Any borehole enlargement of depth greater than about one-eighth inch can seriously affect the formation radiation measurement.

To help eliminate the troublesome borehole rugosity effects on the formation radiation measurement, the radiation detector should be housed in a pad 13 which is small enough to track short borehole enlargements. Most such enlargements can be tracked by a radiation detector pad that is on the order of one foot in length. The radiation detector pad 13 includes at least one epithermal neutron detector 19 which is positioned against one side of pad 13, and a shielding material (i.e., a moderating material with or without an appropriate absorbing material) (not shown) which fills the remaining portion of the pad. Such a detector is illustrated in Givens U.S. Pat. No. 4,581,532 and in Allen U.S. Pat. No. 4,692,617, the teachings of which are incorporated herein by reference. The arm 22, shown in FIG. 1, azimuthally orients the pad so that the side of the pad against which the neutron detector is positioned is firmly pressed against the surface of the borehole wall. In this manner, the focusing of the directional sensitivity of the assembly consisting of the neutron detector and the shielding material on the formation is maximized, while the directional sensitivity of such assembly radiation from the borehole fluid is minimized by the moderation and/or absorption of such borehole fluid radiation by the shielding material. Articulating arm 22 is shown in FIG. 1 for purposes only as one example of a means for positioning the radiation detector against the surface of the borehole wall as is illustrated in the aforementioned Allen U.S. Pat. No. 4,692,617. Other positioning means may also be acceptable such as by locating the radiation detector in the main body of the logging tool and pressing the tool or that portion of the tool housing the radiation detector against the surface of the borehole wall as shown in the aforementioned Givens U.S. Pat. No. 4,581,532 or in the aforementioned Loomis U.S. Pat. No. 4,972,082, the teaching of which is also incorporated herein by reference.

Figure 2:
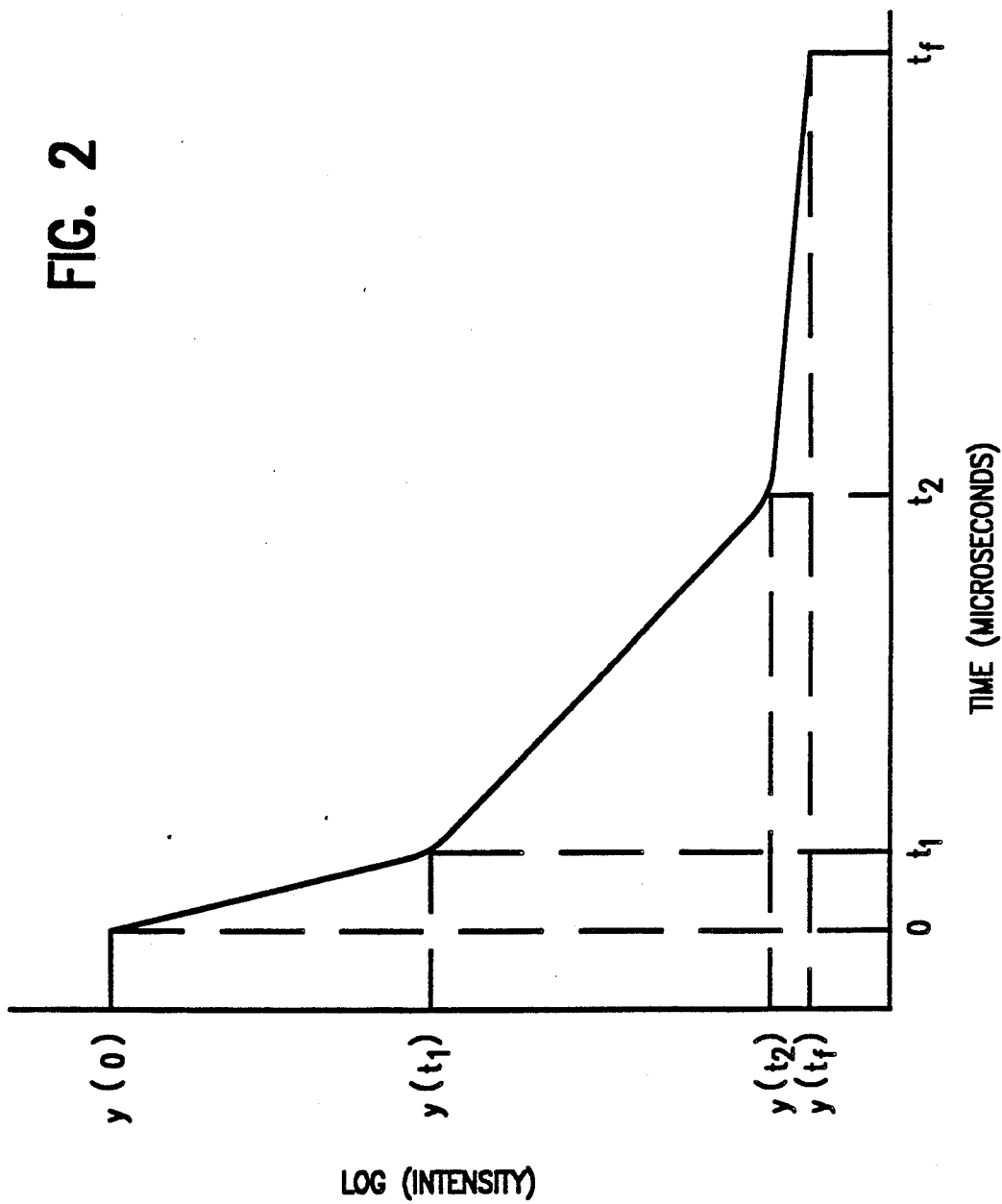
FIG. 2 illustrates a specific example of epithermal neutron die-away measurements as might be made by the borehole logging system of FIG. 1.

Nevertheless, there is still a need for improving on the characterization of the subsurface formation as to porosity in those situations where there is standoff of the neutron detector from the formation, whether due to the pad 13 not being completely in direct contact with the borehole wall or whether due to the entire tool 10 not being in complete contact with the borehole should the articulated pad 13 not be employed and the detector be alternatively housed in the main body of the tool 10. Such improvement, in accordance with a specific feature of the present invention, involves the correcting of the formation decay constant used in producing the porosity log for such detector standoff in accordance with a function relating formation decay constant to the ratio of borehole to formation components of die away amplitude, particularly where the measured die-away is comprised of a plurality of exponential terms, such as represented by the die-away curve illustrated in FIG. 2. For purposes of illustration, the curve in FIG. 2 is assumed to consist of the sum of two epithermal neutron die-away components and one thermal neutron die-away component. A first exponential die-away component $A_1 e^{-\mu_1 t}$ from 0 to $t_1$ microseconds represents predominantly the rate of die-away of epithermal neutrons attributable to borehole effects. A second exponential die-away component $A_2 e^{-\mu_2 t}$ from $t_1$ to $t_2$ microseconds represents predominantly the rate of die-away of epithermal neutrons attributable to formation effects. A third die-away component $A_3 e^{-\mu_3 t}$ from $t_2$ to $t_f$ microseconds represents predominantly the rate of die-away attributable to thermal neutron effects. Each of these components can frequently be observed as a straight line when total intensity is plotted on a semilogarithmic scale during the time domain when the effect is dominant. For a more detailed description of such a plurality of die-away characteristics, as well as a description of a borehole logging apparatus 10, including surface equipment, for making the die-away data measurements, reference may be had to the aforementioned U.S. Pat. Nos. 4,097,737; 4,556,793; and 4,590,370, the teachings of which are incorporated herein by reference.

Figure 3:
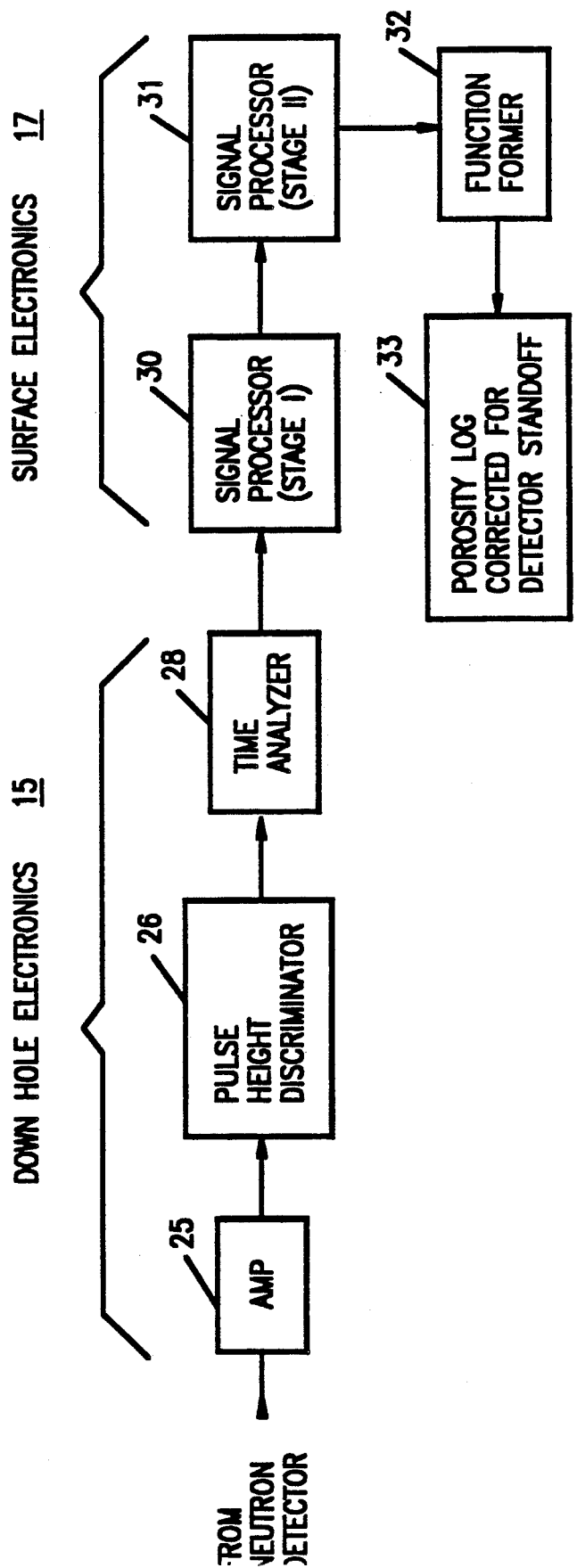
FIG. 3 illustrates the downhole and uphole electronics units of the borehole logging system of FIG. 1.

Referring now to FIG. 3 there is shown the downhole electronics 15 and surface electronics 17 useful for processing the die-away signals from the nuclear detector and producing the desired porosity log corrected for standoff. The die away signal from the neutron detector within pad 13 of FIG. 1 is applied through amplifier 25 and pulse height discriminator 26 to a time analyzer 28.

Time analyzer 28 stores the incoming die-away signal as a multichannel time sequence of counts representing the die-away spectrum. Preferably this is a sequence of contiguous channels each one microsecond in width, but other recording modes could be used. The die-away signal is accumulated over a time frame of approximately one second and corresponds to approximately 5000 firings of the neutron source. The spectrum thus accumulated is then passed to uphole electronics 17 for processing.

The uphole electronics 17 is controlled by a master digital computer (Hewlitt Packard Model 1000 for example). A first signal processor (Stage I) 30 solves equations which relate time moments calculated for the accumulated data spectrum with time moments calculated for the mathematical model of the die-away process. This solution produces the parameters $A_i$ and $\mu_i$ previously described.

The parameters $A_i$ and $\mu_i$ are then passed to a second signal processor (Stage II) 31 where the formation die-away parameter $\mu_2$ is corrected for standoff effects by the ratio R of the amplitude of its borehole die-away component $A_1$, as described above, to the amplitude of its formation component $A_2$. Thereafter a standoff corrected formation decay constant is produced and applied to function former unit 32 which utilizes calibration measurements taken in borehole models at known porosities and conditions of detector standoff to produce the desired porosity versus depth recording 33, or log.

Figure 4:
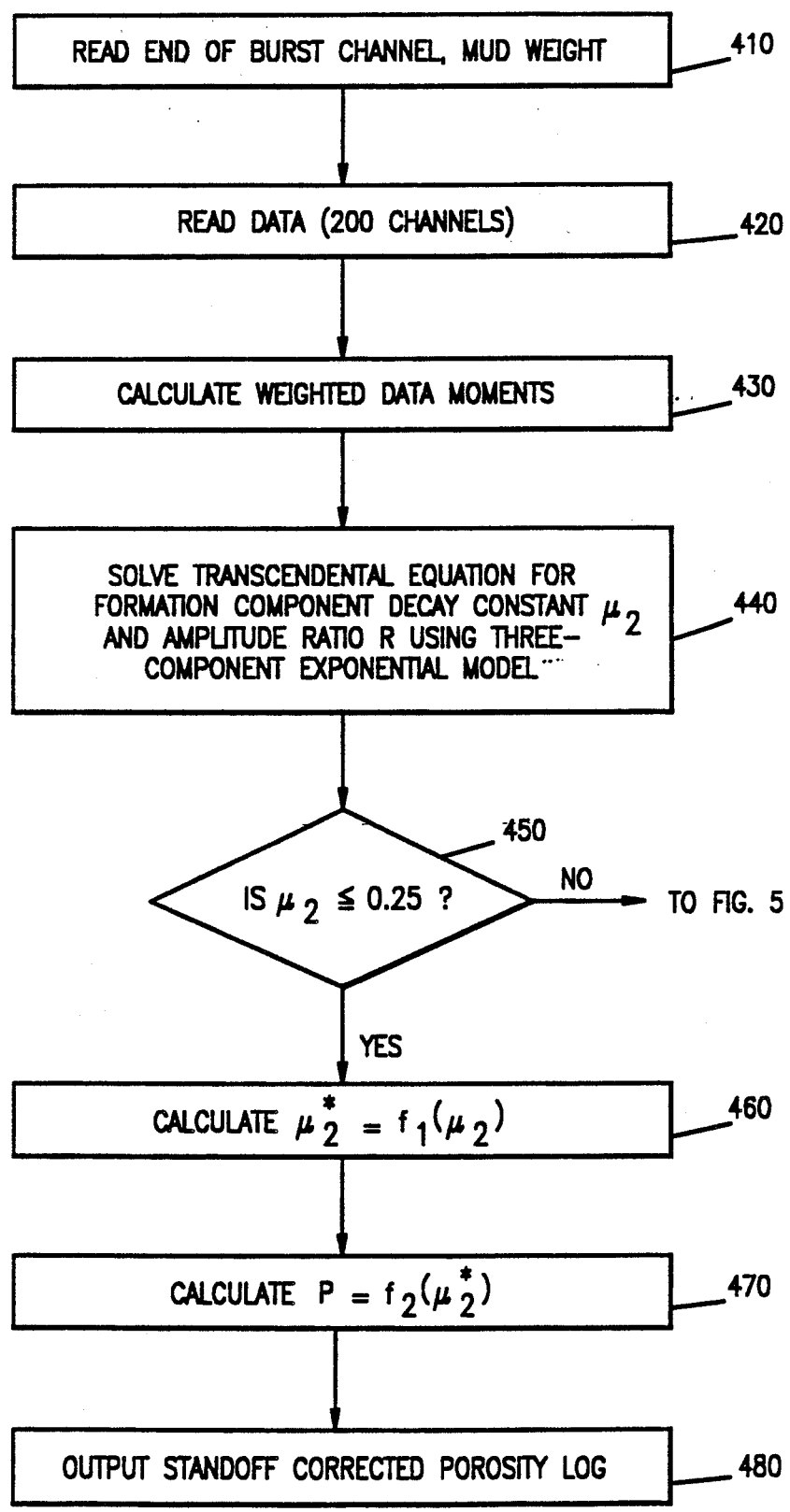
FIGS. 4 & 5 are flow charts representing the steps carried out in accordance with the method of the present invention for correcting the die-away of nuclear radiation measurements of FIG. 2 for the effect of detector standoff from the formation.
Figure 5:
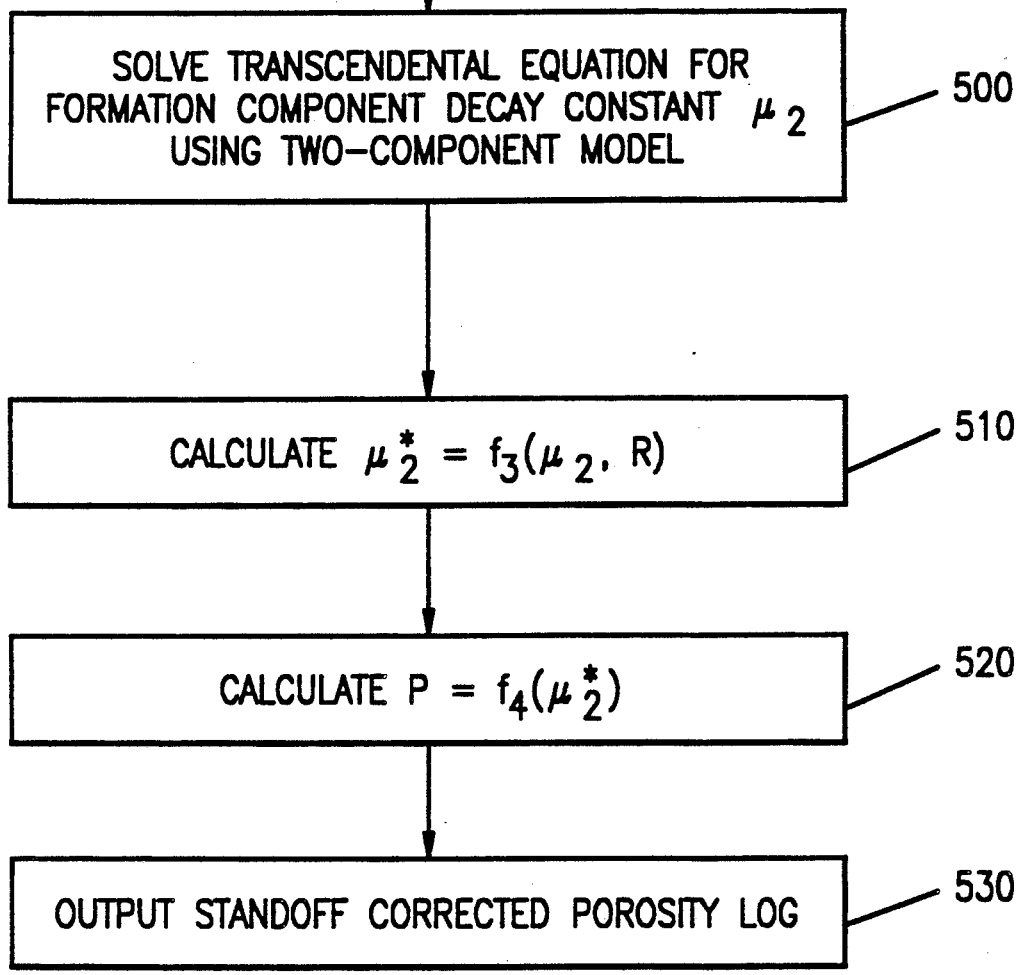

A detailed explanation of the operation of the uphole electronic signal processing will now be made in conjunction with the flow charts of FIGS. 4 and 5. The characteristic parameter requiring correction is the lifetime (or decay constant) of the formation and the characteristic parameter which can be used for correction is the ratio of the amplitude of the borehole component to the amplitude of the formation component of the die-away measurement. This amplitude ratio can be used to correct the measured lifetime for situations where the detector is not in direct contact with the borehole wall because the effect of the standoff correlates strongly with the amplitude ratio when the time dependence of the borehole measurement is modeled as the sum of three exponential functions: a borehole component, a formation component and a thermal neutron "background" component, as shown in steps 410–480 of FIG. 4. The measured epithermal neutron signal f(t) can be expressed as:

$$f(t) = A_1 e^{-\mu_1 t} + A_2 e^{-\mu_2 t} + A_3 e^{-\mu_3 t} \quad (1)$$

where the capital letters $A_1$–$A_3$ denote amplitudes and the Greek lower case letters $\mu_1$–$\mu_3$ denote decay constants of the three components. In this representation the letters $A_1$ and $\mu_1$ apply to the borehole component, the letters $A_2$ and $\mu_2$ apply to the formation component, and the letters $A_3$ and $\mu_3$ apply to the thermal neutron background component.

If the radiation detector is strongly focused on the formation by appropriate shielding and by tool design and positioning, then decay constant $\mu_1$ can be treated as a constant parameter determined by calibration of the measurement in suitable borehole models of known physical characteristics. Decay constant $\mu_3$, although varying with formation and borehole properties, can be assumed a constant average value because of the small effect of the thermal neutron background component on the epithermal neutron measurement ($A_3 << A_1$ or $A_2$). This leaves the decay constant $\mu_2$ and the amplitudes $A_1$, $A_2$ and $A_3$ to be determined from the borehole measurement (steps 410–420). Three parameters can be determined from the calculation of three weighted moments (step 430) of the epithermal neutron flux; these are $A_1/A_2$, $A_3/A_2$ and $\mu_2$. It is not necessary to solve for the absolute magnitudes of $A_1$, $A_2$ or $A_3$.

If exponential weighting is used to suppress the effect of later data channels with increasingly large statistical uncertainties, the expected values of the three model moments of time are:

$$E[t_j] = \left[ \sum_i t_i w_{ji} f(t_i) \right] / \left[ \sum_i w_{ji} f(t_i) \right] \quad (2)$$

where $$w_{ji} = e^{-z_j t_i}, \quad (3)$$

$j = 1, 2, 3,$ and the sums are over the appropriate time intervals where the exponential model is valid. Reasonable choices for the $z_j$ range from about 0.01 inverse microsecond to about 0.5 inverse microsecond. Three intensity moments are expressed:

$$\tilde{t}_j = \left[ \sum_i t_i w_{ji} N_i \right] / \left[ \sum_i w_{ji} N_i \right], \quad (4)$$

$j = 1, 2, 3,$ where $N_i$ is the intensity of the recorded data.

The three exponentially weighted model and intensity moments are equated and the resulting equations solved for $A_1/A_2$, $A_3/A_2$ and $\mu_2$.

The exponentially varying intensity data are measured as a continuous function of time or in discrete time intervals. Firstly, with respect to the continuous case, the intensity data are modeled as follows:

$$f(t) = \sum_{k=1}^{3} A'_k e^{-\mu'_k t} \quad (5)$$

where $\mu'_k$ are the decay constants for the continuous case and $A'_k$ are the amplitudes. The expected value of weighted moments of time with exponential weighting are determined from the model as follows:

$$E[t_j(t_a, t_b)] = \frac{\int_{t_a}^{t_b} t e^{-z_j t} f(t) dt}{\int_{t_a}^{t_b} e^{-z_j t} f(t) dt} \quad (6)$$

for each $z_j$.

The weighted moments of data are then computed as:

$$\tilde{t}_j(t_a, t_b) = \frac{\int_{t_a}^{t_b} t e^{-z_j t} y(t) dt}{\int_{t_a}^{t_b} e^{-z_j t} y(t) dt} \quad (7)$$

where y(t) represents the continuous data.

Next the corresponding model and intensity moments are equated:

$$E[t_j(t_a, t_b)] = \tilde{t}_j(t_a, t_b) \quad (8)$$

for all three weighting functions yielding three transcendental equations. The three equations are solved simultaneously for estimates of the parameters $A'_1/A'_2$, $A'_3/A'_2$ and the formation component decay constant $\mu_2'$ with the borehole component decay constant $\mu'_1$ and the thermal neutron component decay constant $\mu'_3$ being known (step 440). It is not necessary to determine $A'_2$. The starting time $t_a$ and ending time $t_b$ are illustrated in FIG. 2. For the continuous case $A'_k$ has units of counts per unit interval and $\mu'_k$ has units of inverse unit interval.

Secondly, with respect to the discrete case, the intensity data are modeled as follows:

$$F(n) = \sum_{k=1}^{3} A''_k e^{-\mu''_k n} \quad (9)$$

where $n = 1, \ldots, N$. The decay constants are $\mu''_k$ for the discrete case and the amplitudes are $A''_k$. The expected value of weighted moments of time interval with exponential weighting are determined from the model as follows:

$$E[n_j(n_a,n_b)] = \frac{\sum_{n_a}^{n_b} n e^{-z'_j n} F(n)}{\sum_{n_a}^{n_b} e^{-z'_j n} F(n)} \quad (10)$$

for each $Z'_j$ (different from $Z_j$ only by conversion to discrete time channels). The weighted moments of intensity are then computed as follows:

$$\tilde{n}_j(n_a,n_b) = \frac{\sum_{n_a}^{n_b} n e^{-z'_j n} Y(n)}{\sum_{n_a}^{n_b} e^{-z'_j n} Y(n)} \quad (11)$$

where $Y(n)$ represents the discrete data. Next the corresponding model and intensity moments are equated:

$$E[n_j(n_a,n_b)] = \tilde{n}_j(n_a,n_b) \quad (12)$$

yielding three transcendental equations which are solved simultaneously for estimates of the three parameters $A''_1/A''_2$, $A''_3/A''_2$ and the formation component decay constant $\mu''_2$ with the borehole component decay constant $\mu''_1$ and the thermal neutron component decay constant $\mu''_3$ being known. For the discrete case $A''_k$ has units of counts per unit time and $\mu''_k$ has units of inverse unit time.

Reasonable choices for the $Z'_j$ are 1/64, 1/32 and 1/16 when the time channels are each 1 $\mu$s in duration.

After solving the resulting transcendental equation for the model parameters by an iterative technique or Newton's method, a decision is made on the need for employing a double exponential model. The decision can be based on the decay constant $\mu_2$ (i.e., $\mu'_2$ for the continuous case or $\mu''_2$ for the discrete case) or the amplitude ratio $A_1/A_2$ (hereinafter termed R). Illustrated in FIG. 4 is the use solely of $\mu_2$ as the decision parameter (step 450). The standoff-corrected decay constant $\mu_2^*$ is then calculated from the empirical equation for both the continuous and discrete cases (step 460):

$$\mu_2^* = f_1(\mu_2, R) \quad (13)$$

A useful form for the function of Equation (14) is:

$$(1/x^*) = (1/x)(1 + a(R - R_0)), \text{ or} \quad (14)$$

$$(1/x^*) = (1/x)(1 + b(1/x)) \quad (15)$$

where $$R_0 = c + dx + ex^2, \quad (16)$$

a–e are empirical constants and x is either $\mu_2'$ for the continuous case or $\mu_2''$ for the discrete case.

Having obtained a corrected value for $\mu_2$, conversion to a porosity P versus depth log is done by a second empirical equation (step 470):

$$P = f_2(\mu_2^*) \quad (17)$$

A useful form is:

$$P = g + hx + mx^2 + px^3 \quad (18)$$

where x again stands for $\mu_2'$ or $\mu_2''$ and g, h, m and p are empirical constants. The empirical constants a–e, g, h, m and p are obtained from logging tool measurements made in borehole models under known conditions. It is obvious that the amplitude ratio R can be calibrated in terms of detector standoff and that this apparent standoff can be an output value if desired.

Clearly, to obtain two accurate empirical equations for equations (13) and (17), it is necessary to have measurements made in borehole models at several porosities for a variety of separation conditions. A practical minimum is probably four porosities and four different conditions of detector formation separation. Many more combinations would be helpful. The experimental measurements can obviously be augmented by accurate theoretical calculations, and these should be used when practical. It should be apparent to those skilled in the art that such empirical functions can have many acceptable forms other than those set forth above in equations (14), (15), (16) and (18). The best form is usually selected on some goodness of fit criterion.

One additional step, alluded to earlier, should be taken to enhance results. When standoff is large or when porosity is high the number of counts recorded in a time analyzer is reduced and the three-exponential model will produce results having larger statistical fluctuations than desired. In this case the analysis for the decay constant $\mu_2$ is switched to a two-exponential model, as shown in steps 500–530 of FIG. 5, representing only the formation and the thermal neutron background. The general equation for f(t) symbolically representing both the continuous and discrete cases is then $$f(t) = \sum_{k=2}^{3} A_k e^{-\mu_k t}, \text{ or} \quad (19)$$

$$f(t) = A_2 e^{-\mu_2 t} + A_3 e^{-\mu_3 t} \quad (20)$$

The stand-off corrected decay constant is then calculated for either the continuous or discrete cases (step 510):

$$\mu_2^* = f_3(\mu_2, R) \quad (21)$$

Conversion to the porosity versus depth log is then derived by (step 520):

$$P = f_4(\mu_2^*) \quad (22)$$

This use of a two-exponential model may require that the analysis be started a few channels later in time, but it still produces superior results because the three-exponential model has become so dominated by the borehole component that measurement sensitivity to the desired formation component is reduced. The switch from three exponentials to two exponentials can be based on statistical considerations, but in practice it may be desirable to make the change at a porosity corresponding to the upper limit of very well-consolidated formations. A porosity of approximately 20 percent should avoid serious borehole rugosity problems at the point of change. Note that the amplitude ratio R from the three-exponential model is always used to determine the effect of detector formation separation, even when the two-exponential model is used to determine $\mu_2$. It will normally be desirable to display on the porosity log the magnitude of the porosity correction (in porosity units) as well as the corrected porosity. The amplitude ratio may also be displayed directly as an indicator of rugosity or it can be calibrated and displayed as an apparent standoff.

It should be clear to those skilled in the art that the data moment calculations used in the three-exponential model can be used in the two-exponential model without recalculation and that the well-known equation for the sum of a finite geometric series should be used to simplify certain sums in the model representations.

Having now described the present invention in conjunction with a preferred embodiment, it is to be understood that various modifications and alterations may be apparent from the spirit and scope of the invention as set forth in the appended claims. For example, if amplitude $A_3$ were made to be very small (i.e., $A_3 \approx 0$) through use of a thick thermal neutron shield, then only two weighted moments are needed to solve for decay constant $\mu_2$ and amplitude ratio $A_1/A_2$ provided decay constant $\mu_1$ is fixed. If $\mu_1$ is not fixed, then three weighted moments must be determined to obtain $\mu_1, \mu_2$ and $A_1/A_2$.

Further, a modulated exponential form may be used to represent the data. One of the simplest forms is:

$$f(t) = \sum_{i=1}^{3} A_i t^{\alpha_i} e^{-\mu_i t} \tag{23}$$

where the $\alpha_i$ are constants. The $\alpha_i$ will normally be determined from measurements in borehole models. This avoids the calculation of additional moments in the real-time data analysis algorithm. Such modulated exponential forms may fit the somewhat scattered data that must normally be worked with satisfactorily. However, they generally result in expressions involving the gamma function and are thus not as convenient to use as expressions involving the standard exponential function.

Still further, the calibrated output could be hydrogen index instead of porosity. The lifetime measurement is most generally calibrated in terms of hydrogen concentration and could be presented this way. It is assumed that the pore space is completely saturated with fresh water in order to present a porosity curve. False (i.e., low) porosity values are recorded in low-pressure gas zones and in partially-saturated zones which are above the water table.

We claim:

1. A method for converting signals representing the die-away of nuclear radiation in a subsurface formation surrounding a borehole into a log representing porosity versus depth within said subsurface formation corrected for the effect of detector standoff from the borehole wall, a) lowering a logging tool having a neutron source and a neutron detector into said borehole, b) irradiating said subsurface formation with neutrons from said neutron source as said logging tool is traversed along said subsurface formation, c) recording die-away signals representing the die-away of nuclear radiation in said subsurface formation as detected by said neutron detector, d) producing intensity signals representing the variations in intensity of said die-away signals, e) producing a model of the die-away of nuclear radiation in said subsurface formation having terms varying exponentially in response to borehole, formation and background effects on the die-away of nuclear radiation as detected by said detector, f) producing weighted moments of said model and of said intensity signals, g) producing a ratio of the borehole amplitude to formation amplitude components of said intensity signals derived from said weighted moments, h) producing an initial formation decay constant signal from formation and thermal neutron background terms of said model and said intensity signals, i) producing a standoff corrected formation decay constant signal in accordance with a function of said ratio and said initial formation decay constant signal derived from die-away signals recorded in borehole models at known porosities and conditions of detector standoff from the borehole wall, and j) producing a log of porosity versus depth within said subsurface formation corrected for detector standoff from the borehole wall as a function of said standoff corrected formation decay constant signal derived from calibrated measurements in borehole models at known porosities and conditions of detector standoff from the borehole wall.

2. The method of claim 1 wherein said model of the die-away of nuclear radiation is produced from a sum of exponential terms as follows:

$$f(t) = A_1 e^{-\mu_1 t} + A_2 e^{-\mu_2 t} + A_3 e^{-\mu_3 t}$$

where
$A_1$ = borehole amplitude
$A_2$ = formation amplitude
$A_3$ = background amplitude,
$\mu_1$ = borehole decay constant,
$\mu_2$ = formation decay constant, and
$\mu_3$ = background decay constant.

3. The method of claim 1 wherein:

a) said weighted moments of said model are produced as follows:

$$E[t_j] = \Sigma t_i w_{ji} f(t_i) / \Sigma w_{ji} f(t_i),$$

where
$w_{ji} = e^{-z_j t_i}$,
$z_j$ = weighting function decay constant
$j = 1, 2, 3$, and b) said weighted moments of said intensity signals are produced as follows:

$$t_j = \sum_i t_i w_{ji} N_i / \sum_i w_{ji} N_i,$$

where $N_i$ = intensity of the recorded data.

4. A method for converting signals representing the die-away of nuclear radiation in a subsurface formation surrounding a borehole into a log representing porosity versus depth within said subsurface formation corrected for the effect of detector standoff from the borehole wall,
   a) lowering a logging tool having a neutron source and a neutron detector into said borehole,
   b) irradiating said subsurface formation with neutrons from said neutron source as said logging tool is traversed along said subsurface formation,
   c) recording die-away signals representing the die-away of nuclear radiation in said subsurface formation as detected by said neutron detector,
   d) producing intensity signals representing the variations in intensity of said die-away signals,
   e) producing a model of the die-away of nuclear radiation in said subsurface formation having three exponential terms varying in response to borehole, formation and thermal neutron background effects on said die-away signals as follows:

$$f(t) = \sum_{k=1}^{3} A_k e^{-\mu_k t},$$

where
$\mu_1$ = borehole decay constant,
$\mu_2$ = formation decay constant,
$\mu_3$ = thermal neutron background decay constant
$A_1$ = borehole amplitude,
$A_2$ = formation amplitude,
$A_3$ = thermal neutron background amplitude,
$t$ = time,
   f) determining the expected value of weighted model moments with exponential weighting in accordance with the three-exponential model of step e) as follows:

$$E[t_j(t_a,t_b)] = \frac{\int_{t_a}^{t_b} t e^{-z_j t} f(t) dt}{\int_{t_a}^{t_b} e^{-z_j t} f(t) dt}$$

where
$z_j$ = weighting function decay constant
$t_a$ = starting time,
$t_b$ = ending time,
   g) determining weighed moments of said intensity signals with exponential weighting in accordance with the three-exponential model of step d) as follows:

$$\tilde{t}_j(t_a,t_b) = \frac{\int_{t_a}^{t_b} t e^{-z_j t} y(t) dt}{\int_{t_a}^{t_b} e^{-z_j t} y(t) dt}$$

where $y(t)$ = intensity h) equating said weighted model moments with said weighted intensity moments;

$$E[t_j(t_a,t_b)] = \tilde{t}_j(t_a,t_b)$$

i) utilizing said equated weighted model and intensity signal moments from step h) to determine a ratio signal R of the borehole amplitude $A_1$ to the formation amplitude $A_2$ components of said intensity signal:

$$R = A_1/A_2,$$

j) determining an initial formation decay constant $\mu_2$ utilizing at least the two-exponential terms of said equated weighted model and intensity signal moments from step h) attributable to the formation and thermal neutron background effects,
   k) determining a standoff corrected formation decay constant $\mu_2^*$ for detector standoff from the borehole wall in accordance with a function $f(\mu_2, R)$, derived from calibration measurements taken in borehole models at known porosities and conditions of detector standoff from the formation:

$$\mu_2^* = f(\mu_2, R), \text{ and}$$

l) producing a porosity versus depth log of said subsurface formation corrected for detector standoff from the borehole wall as a function of said standoff corrected decay constant $\mu_2^*$ derived from calibrated measurements in said borehole models at said known porosities and conditions of detector standoff from the borehole wall.

5. The method of claim 4 wherein step j) of determining the initial formation decay constant $\mu_2$ is carried out utilizing all three exponential terms of said equated weighted model and intensity moments attributable to borehole, formation and thermal neutron background effects.

6. A method for converting signals representing the die-away of nuclear radiation in a subsurface formation surrounding a borehole into a log representing porosity versus depth within said subsurface formation corrected for the effect of detector standoff from the borehole wall,
   a) lowering a logging tool having a neutron source and a neutron detector into said borehole,
   b) irradiating said subsurface formation with neutrons from said neutron source as said logging tool is traversed along said subsurface formation,
   c) recording die-away signals representing the die-away of nuclear radiation in said subsurface formation as detected by said neutron detector,
   d) producing intensity signals representing the variations in intensity of said die-away signals,
   e) producing a model of the die-away of nuclear radiation in said subsurface formation having three exponential terms varying in response to borehole, formation and thermal neutron background effects on said measurements as follows:

$$F(n) = \sum_{k=1}^{3} A_k e^{-\mu_k n},$$

where
$\mu_1$ = borehole decay constant,
$\mu_2$ = formation decay constant, $\mu_3$ = thermal neutron background decay constant
$A_1$ = borehole amplitude,
$A_2$ = formation amplitude,
$A_3$ = thermal neutron background amplitude, and
n = 1, 2, ..., N (discrete intervals of time), f) determining the expected value of weighted model moments with exponential weighting in accordance with the three-exponential model of step e) as follows:

$$E[n_j(n_a,n_b)] = \frac{\sum_{n_a}^{n_b} n e^{-z_j/n} F(n)}{\sum_{n_a}^{n_b} e^{-z_j/n} F(n)}$$

where
$z_j$ = weighting function decay constant
$n_a$ = discrete interval starting time,
$n_b$ = discrete interval ending time, g) determining weighted moments of said intensity signals with exponential weighting in accordance with the three-exponential model of step d) as follows:

$$\bar{n}_j(n_a,n_b) = \frac{\sum_{n_a}^{n_b} n e^{-z_j/n} Y(n)}{\sum_{n_a}^{n_b} e^{-z_j/n} Y(n)}$$

where Y(n) represents discrete data, h) equating said weighted model moments with said weighted intensity moments:

$$E[n_j(n_a,n_b)] = \bar{n}_j(n_a,n_b),$$

i) utilizing said equated weighted model and intensity moments from step e) to determine a ratio signal R of the borehole amplitude $A_1$ to the formation amplitude $A_2$ components of said intensity signal:

$$R = A_1 A_2,$$

j) determining an initial formation decay constant $\mu_2$ utilizing at least the two-exponential terms of said equated weighted model and intensity signal moments from step h) attributable to the formation and thermal neutron background effects, and k) determining a standoff corrected formation decay constant $\mu_2^*$ for detector standoff from the borehole wall in accordance with a function $f(\mu_2, R)$, derived from calibration measurements taken in borehole models at known porosities and conditions of detector standoff from the formation:

$$\mu_2^* = f(\mu_2, R), \text{ and}$$

l) producing a porosity versus depth log of said subsurface formation corrected for detector standoff from the borehole wall as a function of said standoff corrected decay constant $\mu_2^*$ derived from calibrated measurements in said borehole models at said known porosities and conditions of detector standoff from the borehole wall.

7. The method of claim 6 wherein step j) of determining the initial formation decay constant $\mu_2$ is carried out utilizing all three exponential terms of said equated weighted model and intensity signal moments attributable to borehole, formation and thermal neutron background effects.

8. Apparatus for converting die-away signals representing the die-away of nuclear radiation in a subsurface formation surrounding a borehole into a log representing porosity versus depth within said formation corrected for the effect of detector standoff from the borehole wall, comprising:

a) a borehole logging tool,
b) means for traversing said logging tool along said borehole,
c) a pulsed source of fast neutrons within said logging tool for irradiating the formation surrounding a borehole with fast neutrons,
d) at least one directionally sensitive radiation detector assembly having a neutron detector for measuring the die-away of secondary radiation produced by the fast neutrons which returns to the borehole from the irradiated formation,
e) means for positioning said at least one radiation detector assembly so that it contacts the surface of the borehole wall and is oriented to position the neutron detector to maximize directional sensitivity of the neutron detector to radiation from the formation at the point of contact of the at least one radiation detector assembly with the borehole wall and to minimize directional sensitivity to radiation from the borehole fluid,
f) means for producing die-away signals representative of the secondary radiation measured by said detector as said logging tool traverses said borehole,
g) means for producing an initial formation decay constant from at least formation and background components of said die-away signals,
h) means for producing a ratio of the borehole amplitude to formation amplitude components of said die-away signals,
i) first function former means for producing a standoff corrected formation decay constant in accordance with a function of said ratio and said initial formation decay constant to correct for any standoff from the borehole wall encountered by said detector as said logging tool traverses said borehole, and
j) second function former means for producing a log of porosity versus depth within said formation corrected for detector standoff from the borehole wall as a function of said standoff corrected formation decay constant derived from measurements in borehole models at known porosities and conditions of detector standoff from the borehole wall.

9. The apparatus of claim 8 wherein said porosity log is standoff corrected for any borehole enlargement that occurs in juxtaposition with said at least one radiation detector assembly as said logging tool traverses along said borehole.

10. The apparatus of claim 8 wherein said porosity log is standoff corrected for pulling away of the at least one radiation detector assembly from contact with the surface of the borehole wall as said logging tool traverses along said borehole.

* * * * *

UNITED STATES PATENT AND TRADEMARK OFFICE
CERTIFICATE OF CORRECTION

PATENT NO. : 5,068,531

DATED : November 26, 1991

INVENTOR(S) : Allen et al

It is certified that error appears in the above-identified patent and that said Letters Patent is hereby corrected as shown below:

On the Title page

[75] Inventors: "Daivd should read --David--

Column 10, line 61, "jji" should read --ji--

Column 11, line 3, "tj" should read --$\overline{t}_j$--

Column 11, line 30, "μkt" should read --$\mu_k t$--

Column 11, lines 46-50, two occurrences of "-zjt" should read -- $-z_j t$ --

Column 11, lines 61-66, "$\tilde{t}$" should be -- $\overline{t}$ --, and two occurrences of "-zjt" should read -- $-z_j t$ --

Column 12, line 4, "$\tilde{t}$" should be -- $\overline{t}$ --

Column 12, line 21, "μ2" should be -- $\mu_2$ --

Column 12, line 26, two occurrences of "μ2" should be -- $\mu_2$ --

Column 12, line 63, "μkn" should read -- $\mu_k n$ --

Column 13, lines 10-15, "zjn" should read -- $z_j n$ -- (both occurrences)

Column 13, lines 25-30, "nj" should be --$\overline{n}_j$--, and "zjn" should read -- $z_j n$ --

Column 13, line 36, "$\tilde{n}$" should be --$\overline{n}$--

Signed and Sealed this

Twenty-third Day of March, 1993

*Attest:*

STEPHEN G. KUNIN

*Attesting Officer*    *Acting Commissioner of Patents and Trademarks*